US008315950B2

(12) United States Patent
Conley et al.

(10) Patent No.: US 8,315,950 B2
(45) Date of Patent: Nov. 20, 2012

(54) POWERFULLY SIMPLE DIGITAL MEDIA PLAYER AND METHODS FOR USE THEREWITH

(75) Inventors: Kevin M. Conley, San Jose, CA (US); Daniel Schreiber, Palo Alto, CA (US); Avraham Shmuel, Kfar-Sirkin (IL); Noam Kedem, Foster City, CA (US)

(73) Assignee: SanDisk Technologies Inc., Plano, TX (US)

( * ) Notice: Subject to any disclaimer, the term of this patent is extended or adjusted under 35 U.S.C. 154(b) by 812 days.

(21) Appl. No.: 11/967,861

(22) Filed: Dec. 31, 2007

(65) Prior Publication Data

US 2009/0171715 A1    Jul. 2, 2009

(51) Int. Cl.
*G06F 17/30* (2006.01)
(52) U.S. Cl. .................. 705/59; 705/52; 705/57
(58) Field of Classification Search ............. 705/59
See application file for complete search history.

(56) References Cited

U.S. PATENT DOCUMENTS

| | | | |
|---|---|---|---|
| 5,986,200 A * | 11/1999 | Curtin | 84/609 |
| 6,243,725 B1 | 6/2001 | Hempleman et al. | |
| 6,590,303 B1 | 7/2003 | Austin et al. | |
| 6,727,421 B2 | 4/2004 | Izawa et al. | |
| 6,760,721 B1 | 7/2004 | Chasen et al. | |
| 6,763,345 B1 | 7/2004 | Hempleman et al. | |
| 6,842,405 B1 * | 1/2005 | D'Agosto, III | 369/29.02 |
| 7,003,515 B1 | 2/2006 | Glaser et al. | |
| 7,020,048 B2 | 3/2006 | McComas | |
| 7,028,082 B1 | 4/2006 | Rosenberg et al. | |
| 7,076,561 B1 | 7/2006 | Rosenberg et al. | |
| 7,133,924 B1 | 11/2006 | Rosenberg et al. | |
| 7,228,054 B2 | 6/2007 | Cowgill | |
| 7,560,637 B1 * | 7/2009 | Robbin et al. | 84/615 |
| 7,574,672 B2 * | 8/2009 | Jobs et al. | 715/830 |
| 7,956,272 B2 * | 6/2011 | Wysocki et al. | 84/477 R |
| 2001/0013983 A1 | 8/2001 | Izawa et al. | |
| 2002/0026521 A1 * | 2/2002 | Sharfman et al. | 709/231 |

(Continued)

FOREIGN PATENT DOCUMENTS

WO    WO 2004/111882    12/2004

(Continued)

OTHER PUBLICATIONS

International Search Report and Written Opinion for PCT/US2008/013623 dated Mar. 6, 2009, 9 pages.

(Continued)

*Primary Examiner* — Evens J Augustin
(74) *Attorney, Agent, or Firm* — Brinks Hofer Gilson & Lione

(57) ABSTRACT

A powerfully simple digital media player and methods for use therewith are disclosed. In one embodiment, a digital media player with a simplified user interface is disclosed that, like an FM radio, allows a user to easily select a category of digital media for playback. In another embodiment, to make the experience more FM-radio-like for a user, instead of charging the user for the digital audio files, digital media files can be distributed for free (or at a reduced charge) by playing advertisements before, during, or after the playback of a digital audio file. In yet another embodiment, an exemplary network infrastructure is provided. In another embodiment, a generic streaming content file interface is presented. Other embodiments are disclosed, and any of these embodiments can be used alone or in combination with one another.

20 Claims, 7 Drawing Sheets

U.S. PATENT DOCUMENTS

| | | | |
|---|---|---|---|
| 2002/0046181 | A1 | 4/2002 | Story, Jr. et al. |
| 2002/0093884 | A1 | 7/2002 | Hochendoner et al. |
| 2002/0137529 | A1 | 9/2002 | Takahashi |
| 2002/0186842 | A1 | 12/2002 | Sabet-Sharghi et al. |
| 2002/0194260 | A1 | 12/2002 | Headley et al. |
| 2003/0014496 | A1 | 1/2003 | Spencer et al. |
| 2003/0120644 | A1* | 6/2003 | Shirota ............................ 707/3 |
| 2003/0135513 | A1 | 7/2003 | Quinn et al. |
| 2004/0039860 | A1 | 2/2004 | Mills et al. |
| 2004/0198279 | A1 | 10/2004 | Anttila et al. |
| 2004/0215733 | A1 | 10/2004 | Gondhalekar et al. |
| 2004/0254659 | A1 | 12/2004 | Bolas et al. |
| 2004/0261040 | A1 | 12/2004 | Radcliffe et al. |
| 2005/0038796 | A1 | 2/2005 | Carlson et al. |
| 2005/0108754 | A1 | 5/2005 | Carhart et al. |
| 2005/0195696 | A1 | 9/2005 | Rekimoto |
| 2005/0216855 | A1 | 9/2005 | Kopra et al. |
| 2006/0008256 | A1 | 1/2006 | Khedouri et al. |
| 2006/0010394 | A1 | 1/2006 | Chaudhri et al. |
| 2006/0031222 | A1 | 2/2006 | Hannsmann |
| 2006/0195480 | A1 | 8/2006 | Spiegelman et al. |
| 2006/0195864 | A1 | 8/2006 | New et al. |
| 2006/0242068 | A1 | 10/2006 | Jogand-Coulomb et al. |
| 2006/0253782 | A1 | 11/2006 | Stark et al. |
| 2006/0265403 | A1 | 11/2006 | Mercer et al. |
| 2007/0038941 | A1* | 2/2007 | Wysocki et al. ............. 715/748 |
| 2007/0043667 | A1 | 2/2007 | Qawami et al. |
| 2007/0073937 | A1 | 3/2007 | Feinberg et al. |
| 2007/0083556 | A1 | 4/2007 | Plastina et al. |
| 2007/0112785 | A1* | 5/2007 | Murphy et al. ................ 707/10 |
| 2007/0168613 | A1 | 7/2007 | Kim et al. |
| 2007/0256021 | A1 | 11/2007 | Prager et al. |
| 2007/0265097 | A1 | 11/2007 | Havukainen |
| 2007/0282902 | A1 | 12/2007 | Bustelo et al. |
| 2007/0282903 | A1 | 12/2007 | Bustelo et al. |
| 2007/0291404 | A1 | 12/2007 | Morse et al. |
| 2007/0294297 | A1 | 12/2007 | Kesteloot et al. |
| 2008/0010372 | A1 | 1/2008 | Khedouri et al. |
| 2008/0010450 | A1 | 1/2008 | Holtzman et al. |
| 2008/0022207 | A1 | 1/2008 | Hsu et al. |
| 2008/0086379 | A1 | 4/2008 | Dion et al. |
| 2008/0092198 | A1* | 4/2008 | Hutten .......................... 725/133 |
| 2008/0092200 | A1 | 4/2008 | Grady et al. |
| 2008/0094400 | A1 | 4/2008 | Yang et al. |
| 2008/0098447 | A1 | 4/2008 | Yannai |
| 2008/0147711 | A1 | 6/2008 | Spiegelman et al. |
| 2008/0184127 | A1 | 7/2008 | Rafey et al. |
| 2008/0184142 | A1 | 7/2008 | Ijichi et al. |
| 2008/0209322 | A1 | 8/2008 | Kaufman |
| 2008/0222314 | A1 | 9/2008 | Matsushita et al. |
| 2009/0056525 | A1 | 3/2009 | Oppenheimber |
| 2009/0088876 | A1* | 4/2009 | Conley et al. ................... 700/94 |
| 2009/0138907 | A1 | 5/2009 | Wiser et al. |
| 2009/0164473 | A1 | 6/2009 | Bauer |
| 2009/0204929 | A1 | 8/2009 | Baurmann et al. |
| 2009/0241070 | A1* | 9/2009 | Robbin et al. ................ 715/854 |
| 2009/0313303 | A1 | 12/2009 | Spence et al. |
| 2009/0313432 | A1 | 12/2009 | Spence et al. |
| 2010/0153572 | A1 | 6/2010 | Feig et al. |
| 2010/0162120 | A1 | 6/2010 | Niizawa et al. |

FOREIGN PATENT DOCUMENTS

| | | |
|---|---|---|
| WO | WO 2008/007269 | 1/2008 |

OTHER PUBLICATIONS

"Portable Digital Content Device and Methods for Use Therewith," U.S. Appl. No. 11/973,871, filed Oct. 9, 2006, inventors: Kurt Webster, Phil Balma, Mairi MacDonald, Ron Barzilai, Avi Shmuel, Ran Carmeli, David Koren, and Moshe Raines.

"SanDisk Unveils USBTV-First Digital 'Flash DVD Player' for Porting Personal Video and Movies from Home PC to Home TV", http://www.sandisk.com/Corporate/PressRoom/PressReleases/PressRelease.aspx?ID=3678, Jan. 8, 2007, 2 pages.

"What is the Fanfare™ Web Service?", http://fanfare.sandisk.com/help/fanfare-internet-service.html, 1 page, printed on Apr. 8, 2008.

"What is the Fanfare™ Application?", http://fanfare.sandisk.com/help/fanfare-application.html, 1 page, printed on Apr. 8, 2008.

"What is Sansa® TakeTV™?", http://fanfare.sandisk.com/help/sansa-taketv.html, 1 page, printed on Apr. 8, 2008.

"How do Fanfare™ and Sansa® TakeTV™ work together?", http://fanfare.sandisk.com/help/how-does-it-work.html, 1 page, printed on Apr. 8, 2008.

"iTunes 7: The entertainment center of your world.", http://www.apple.com/itunes/overview/, 1 page, printed on Apr. 8, 2008.

"Y! MUSIC™ jukebox", http://help.yahoo.com/l/us/yahoo/music/jukebox/features/index.html, 1 page, printed on Apr. 8, 2008.

"iPod shuffle—Features", http://www.apple.com/ipodshuffle/features.html, 1 page, printed on Apr. 8, 2008.

"SanDisk Annouces the Sansa Connect Wireless Internet MP3 Player", http://www.sandisk.com/Corporate/PressRoom/PressReleases/PressRelease.aspx?ID=3669, 2 pages, Jan. 8, 2007.

"Unlimited Music on Demand—Your Music—Anytime, Anywhere", http://www.napster.com/choose/index_default.html, 1 page, printed on Apr. 8, 2008.

"Rhapsody Channels", http://www.rhapsody.com/channels, 3 pages, printed on Apr. 8, 2008.

"PlaysForSure is growing up!", http://www.microsoft.com/windows/windowsmedia/playsforsure/, 1 page, printed on Apr. 8, 2008.

"XM Channel Lineup", http://www.xmradio.com/onxm/full-channel-listing.xmc, pp. 1-6, printed on Apr. 8, 2008.

"Xpressez®—$39.99*", 1 page, printed on Apr. 8, 2008.

Excerpts from Manual for Creative's Zen Stone: "License and Copyright," "A Tour of Your Player," "Mode Switch", "Playback Order", and "Folder Structure," 5 pages, May 2007.

"VISION listen without limits", http://musicgremlin.com/StaticContent.aspx?id=3, 1 page, printed on Apr. 8, 2008.

"Get a Gremlin today!", http://www.musicgremlin.com/Device/DeviceList.aspx, 1 page, printed on Apr. 8, 2008.

"SOLUTION frequently asked questions", 1 page, http://www.musicgremlin.com/StaticContent.aspx?id=8, 1 page, printed on Apr. 8, 2008.

"Software PlayersPortable Radio Players Premium Radio RadioStoreSupport", http://www.slacker.com/products/portables/, 1 page, printed on Nov. 30, 2007.

AudioFeast's portable Net radio—MP3 users not limited to music, http://www.sfgate.com/cgi-bin/article.cgi?file=/c/a/2004/09/13/BUGV18N97H1.DTL&type . . . , 2 pages, Sep. 13, 2004.

International Search Report and Written Opinion for PCT/US2009/002942 dated Sep. 11, 2009, 9 pages.

Office Action for U.S. Appl. No. 12/157,846, dated May 4, 2011, 17 pages.

Baccigalupo, Claudio, et al., "A Case-Based Song Scheduler for Group Customised Radio", ICCBR 2007, LNAI 4626, Springer-Verlag, Berlin, Germany, © 2007, pp. 433-448.

Baccigalupo, Claudio, et al., "Poolcasting: A Social Web Radio Architecture for Group Customisation", AXMEDIS '07, Barcelona, Spain, Nov. 28-30, 2007, pp. 115-122.

Baccigalupo, Claudio, et al., "Mining Musical Social Networks for Automating Social Music Services", Workshop Notes of the ECML/PKDD 2007 Workshop on Web Mining 2.0, © 2007, pp. 1-12.

Office Action for U.S. Appl. No. 12/157,844, dated Dec. 8, 2010, 16 pages.

Office Action for U.S. Appl. No. 12/157,846, dated Nov. 3, 2010, 11 pages.

"Pseudorandom No. Generator", http://en.wikipedia.org/wiki/Pseudorandom_number_generator, printed May 20, 2008, 5 pages.

"New Rolling Stones Album, A Bigger Bang, Will Be Sold on New Gruvi Music Cards from SanDisk; Using SanDisk's TrustedFlash Technology, Latest Rolling Stones Album Can be Played on Smartphones, Palm Devices and Notebook PCs", Sep. 27, 2005, 2 pages.

Office Action for U.S. Appl. No. 12/338,768, dated Oct. 6, 2011, 13 pages.

Pioneer XMP3 Press Release, Oct. 16, 2008 and XMP3 User Guide, 2008.

Office Action for U.S. Appl. No. 12/338,768, dated Mar. 15, 2011, 10 pages.
Office Action for U.S. Appl. No. 12/157,844, dated Aug. 17, 2011, 20 pages.
"Housing and Clip Assembly for Portable Electronic Device", U.S. Appl. No. 12/134,664, filed Jun. 6, 2008, Inventor: Hyekung Kim.
"User Evaluation of a New Interactive Playlist Generation Concept", Pauws et al., Queen Mary, University of London, pp. 638-643 (225).
Office Action for U.S. Appl. No. 12/157,844, dated Apr. 24, 2012, 17 pages.
Office Action for U.S. Appl. No. 12/157,846, dated Apr. 11, 2012, 10 pages.
Office Action for U.S. Appl. No. 12/338,768, dated Apr. 26, 2012, 12 pages.
Office Action for Chinese Patent Application Serial No. 200880123674.3, dated May 24, 2012, 8 pages.
Office Action for U.S. Appl. No. 12/338,768, dated Aug. 28, 2012, 15 pages.

* cited by examiner

POWERFULLY SIMPLE DIGITAL MEDIA PLAYER AND METHODS FOR USE THEREWITH

BACKGROUND

The usage paradigm created for digital audio players in recent years is based upon the ability of the user to identify and select certain audio tracks or collections for download onto their digital audio players. This paradigm can be seen in any of the major music services such as iTunes, Rhapsody, Yahoo Jukebox, and Napster. It relies on the ability of a user to actually find what he is looking for. Users who are avid consumers of music but do not rely on specific artist or song knowledge, such as radio listeners, may be left with a frustrating experience. In addition, even those users who are comfortable with operating within this paradigm are faced with complicated devices that require sometimes as many as five menu selection tasks before the playing of music can commence. Many times, a user just wants to power-on a digital audio player and start playing a certain type of music without navigating through various menu levels.

FM radio is a technology that does not suffer from the two problems described above. However, FM radio, in its current analog form, does not deliver a satisfying audio experience. In addition, FM radio is geography centric, and a continuous experience is not possible when traveling long distances by car and may be totally impossible under certain circumstances, such as when traveling by airplane or boat or when in remote locations. Streaming audio solutions, such as Internet radio, solve the audio experience problem and provide a satisfying experience in delivering rich content with simplicity. However, this is only available in network-connected environments (even more limited than FM), and PCs and some digital audio players that provide a network connection have user interfaces that can be as, if not more, complicated than the digital audio players described above.

DETAILED DESCRIPTION OF THE PRESENTLY PREFERRED EMBODIMENTS

Introduction

Figure 2:
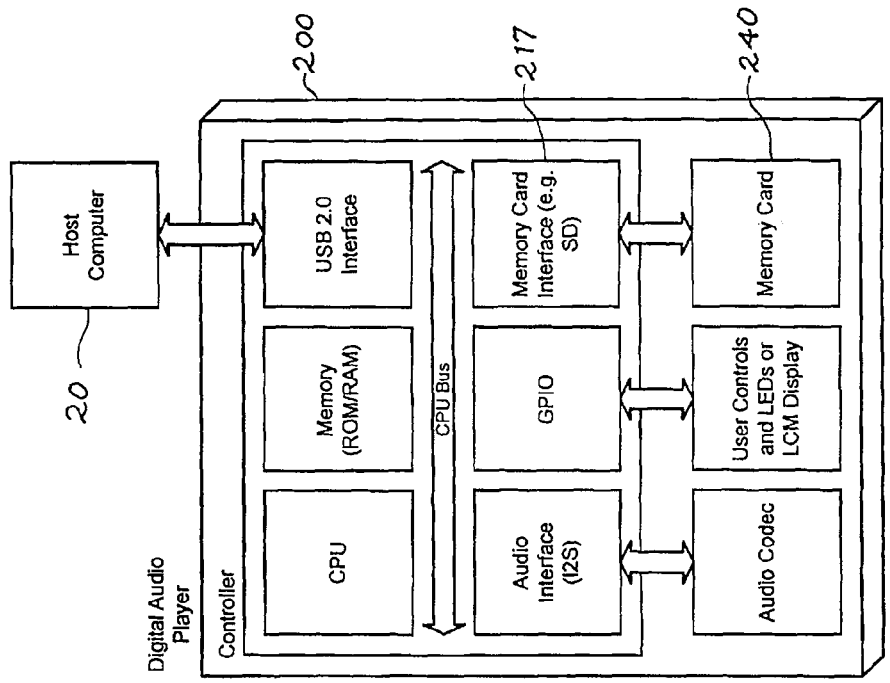
FIG. 2 is a block diagram of a digital media player of an embodiment with a removable memory card.

By way of introduction, the following embodiments generally relate to a powerfully simple digital media player and methods for use therewith. In one embodiment, a digital media player with a simplified user interface is disclosed that, like an FM radio, allows a user to easily select a category of digital media for playback. In another embodiment, to make the experience more FM-radio-like for a user, instead of charging the user for the digital media files, digital media files can be distributed for free (or at a reduced charge) by playing advertisements before, during, or after the playback of a digital media file. In yet other embodiments, an exemplary network infrastructure is provided, as is a generic streaming content file interface.

It is important to note that any of the embodiments described herein can be used alone or in combination with one another. For example, the embodiment directed to ad-supported digital content can be, but does not have to be, used with a digital media player with a simplified user interface. Further, the examples set forth below are merely used to illustrate these embodiments and are not intended as a limitation on the claims.

Digital Media Player Overview

In general, a digital media player is a device having embedded memory storing digital media files (and/or a slot for accepting a memory device, such as a memory card, that stores digital media files) and circuitry for playing the digital media files. The digital media player can comprise other components, such as, but not limited to, a display device, an audio output jack, a speaker, and a wireless transceiver. The memory in the digital media player can take any suitable form, such as, but not limited to, a non-volatile solid-state memory (e.g., flash memory), optical memory, and magnetic memory. As used herein, "circuitry" (or "circuit") can include one or more components and can be a pure hardware implementation and/or a combined hardware/software (or firmware) implementation. Accordingly, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. In addition to being operative to play digital media files, the circuitry can be operative to perform other functions, such as, but not limited to, communicating with a host device via a wired or wireless connection, recording digital media files, and managing the operation of the digital media player. While the digital media player can be a device dedicated to playing digital media, it can also be a device that performs various other functions, in which case the circuitry in the player can also be operative to perform those other functions. For example, a digital media player can be part of a mobile phone, a game device, a personal digital assistant (PDA), an email/text messaging device, or a digital camera.

Digital media can take any suitable form, such as, but not limited to, audio (e.g., a song, spoken word, a podcast, one or a series of sounds, etc.), video (with or without accompanying audio) (e.g., a movie, an episode of a TV show, a news program, etc.), still or moving images (e.g., a photograph, a computer-generated display, etc.), text (with or without graphics) (e.g., an article, a text file, etc.), and a hybrid multimedia presentation of two or more of these forms. For simplicity, in the following embodiments, the digital media player will take the form of a portable digital audio player. Again, a digital audio player is just one of the many forms a digital media player can take, and the claims should not be read as requiring a digital audio player unless that term is explicitly used therein. Accordingly, these embodiments can be adapted for use with other types of digital media (e.g., digital video).

Figure 1:
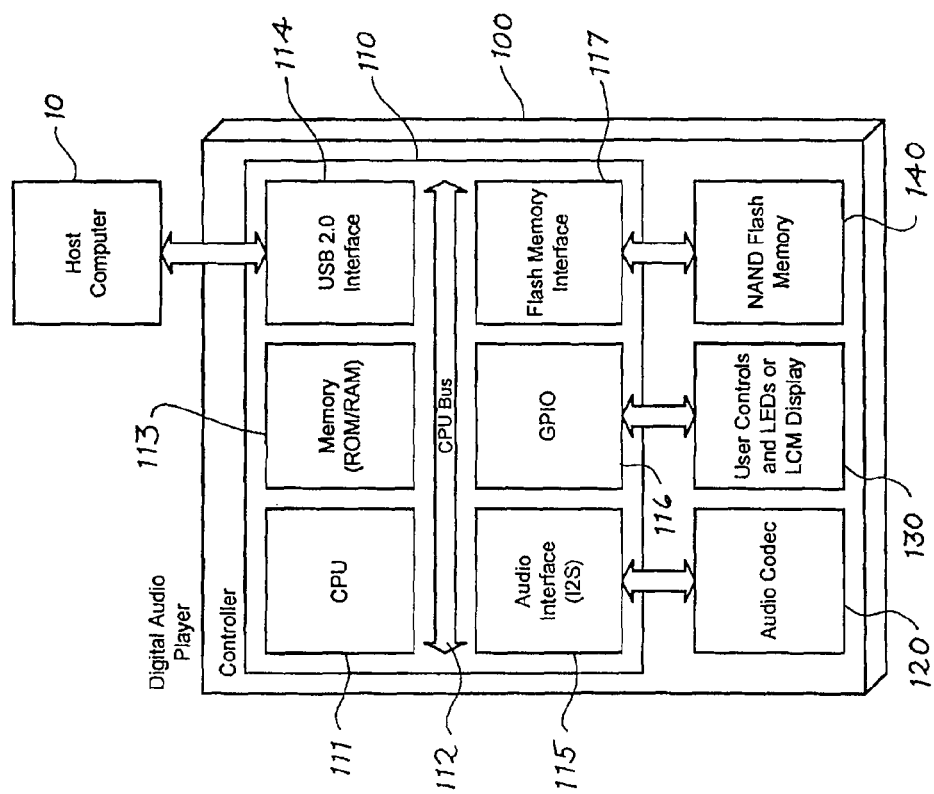
FIG. 1 is a block diagram of a digital media player of an embodiment with embedded memory.

Turning now to the drawings, FIG. 1 is an illustration of a portable digital audio player 100 of an embodiment. As shown in FIG. 1, the digital audio player 100 comprises a controller 110, which, in this embodiment, comprises a central processing unit (CPU) 111 and a CPU bus 112 that places the CPU 111 in communication with several other components in the controller 110: memory (ROM/RAM) 113 that stores computer-readable program code (e.g., firmware) executable by the CPU 111 to run the digital audio player 100, a USB 2.0 interface 114 operative to place the digital audio player 100 in communication with a host computer 10, an audio interface 115 (e.g., an I2S interface), general purpose input-output (GPIO) circuitry 116, and a flash memory interface 117. The digital audio player 100 also comprises an audio codec 120, user controls and LEDs or LCM display 130, and an embedded NAND flash memory 140. (While the memory 140 is shown as a single component in FIG. 1, it should be understood that several separate memory components can be used.) The audio codec 120 is in communication with the audio interface 115 and provides audio output through a headphone jack or speakers (not shown). The user controls and LEDs or LCM display 130 provide a user interface through which a user can control the operation of the digital audio player 100 through the GPIO 116, and the NAND flash memory 140 stores digital audio files that the controller 110 receives via the flash memory interface 117 and plays through the audio interface 115 and the audio codec 120.

In this embodiment, the digital audio player 100 receives digital audio files from the host computer 10 in communication with the digital audio player 100 via the USB 2.0 interface 114. As used herein, the phrase "in communication with" means directly in communication with (e.g., through a wired or wireless connection) or indirectly in communication with through one or more components, which may or may not be shown or described herein.) The digital audio player 100 and the host computer 10 can have mating ports, or a cable or cradle can be used to connect the digital audio player 100 with the host computer 10, which downloads digital content to the embedded NAND flash memory 140 in the player 100. The source of the digital audio files can be the host computer 10 itself or an external location in communication with the host computer 10 via a network, such as the Internet.

It should be noted that the digital audio player 100 shown in FIG. 1 is merely one example of a digital audio player, and variations to the components shown in FIG. 1 can be used. For example, in an alternate digital audio player 200 shown in FIG. 2, the flash memory interface 117 and the embedded NAND flash memory 140 are replaced by a memory card interface 217 (e.g., an SD card interface) and a memory card 240 received by the digital audio player 200 via a memory card slot (not shown). In this embodiment, digital audio files can be presented to the digital audio player 200 via a removable memory card 240 instead of or in addition to downloading digital audio files from the host computer 20. In yet another alternative, a digital audio player can have both embedded memory and a removable memory card. Further, instead of the digital audio player having a wired connection to the host computer, the digital audio player can have a wireless transceiver to place the digital audio player in communication with the host computer. With a wireless transceiver, the digital audio player can even directly communicate with a networked component without the need to use the host computer. (The below embodiments describe network communication with the digital audio player in more detail.) As yet another variation, as indicated in FIGS. 1 and 2, the digital audio player 100, 200 can either have a display device (e.g., an LCM display) or simple LEDs to provide some visual feedback to the user. In an alternate embodiment, neither a display device nor LEDs are used.

With an overview of a digital audio device now presented, the following sections will described several embodiments that can be used alone or in combination with one another.

Digital Audio Player with a Simplified User Interface

As noted in the background section above, many existing digital audio players require sometimes as many as five menu selection tasks before the playing of music can commence. Many times, a user just wants to power-on a digital audio player and start playing a certain type of music without navigating through various menu levels. The following embodiments provide a digital audio player with a simplified user interface that, in many ways, mimics a simple FM radio.

To provide a simple user interface, the digital audio files in this embodiment are grouped into a plurality of categories. As used herein, a "category" refers to a collection of digital media (in this embodiment, audio) files. In some of the embodiments described below, a category may also be referred to as a genre. While a "genre" may connote an established class of audio (e.g., jazz, pop, etc.), it is important to note that a "category" can refer to a broader, less established collection of audio. For example, a category of digital audio files can take the form of a celebrity's favorite songs or a DJ's lunchtime mix, where those songs are in different genres (e.g., the category of music can include jazz as well as pop songs), or songs of different genres that appeal to a certain demographic. Also, as will be discussed in more detail below, the curator of a category (i.e., the entity that assembles (either manually or (semi-)automatically through the use of an algorithm) various digital media files into a category) is typically a third party but, in some situations, can be the user of the digital audio player. Further, the digital audio files in a category may or may not be known to a user in advance of playback, the later situation being similar to a user listening to an FM radio station.

Figure 3:
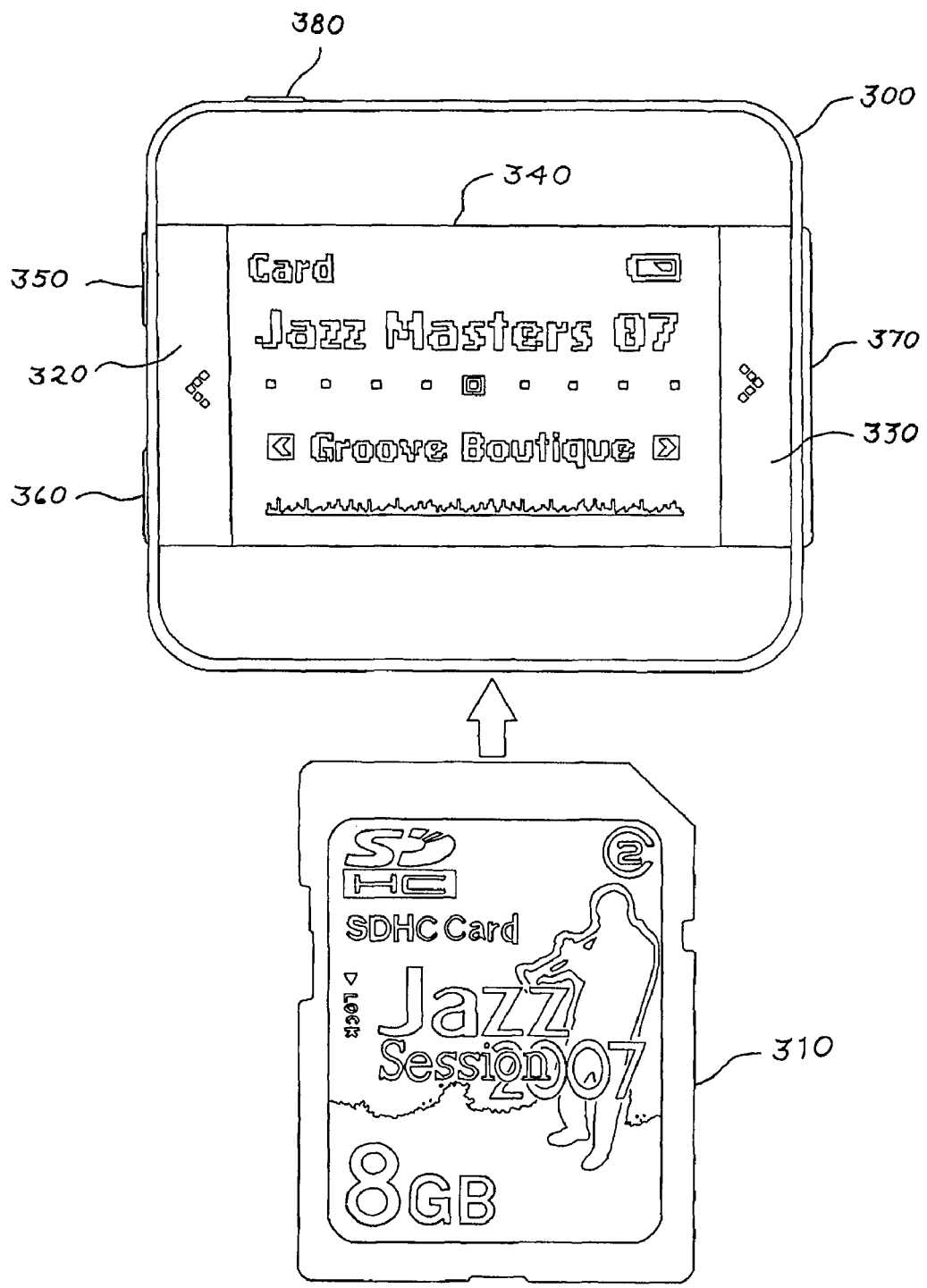
FIG. 3 is an illustration of a digital media player of an embodiment.

Returning to the drawings, FIG. 3 is an illustration of a digital audio player 300 of an embodiment that has a simplified user interface. In this embodiment, a memory card 310 comprising a solid-state memory is used to provide digital audio files to the digital audio player 300 via a memory card slot (not visible in FIG. 3) on the bottom side of the player 300. (As mentioned above, instead of or in addition to using a memory card 310, the digital audio player 300 can receive digital audio files from a host computer and/or a network location.) As indicated on the label of the memory card 310, the memory card 310 stores jazz songs. While all the songs on the memory card 310 are jazz songs, the jazz songs on the memory card 310 are grouped into a plurality of categories (e.g., "Groove Boutique," "Classic Jazz," and "Modern Jazz"). With a memory card 310, digital audio files are grouped into a plurality of categories before the digital audio files are provided to the digital audio player 300, and the curator of the categories is an entity other than the end user.

Preferably, although not required, in this embodiment, the memory card 310 does not contain a general library of digital audio files (jazz or otherwise) outside of these categories. In other words, all the digital audio files that are stored in the memory card 310 for playback by the digital audio player 300 are grouped in one of the plurality of categories. By not having a general library, all of the digital audio files on the memory card 310 that are playable by the digital audio player 300 can be selected for playback using the simplified user interface embodiments described below and do not require the user to perform multiple selection tasks, as would be needed if the user were to navigate and select a digital audio file from a general library.

As shown in FIG. 3, the digital audio player 300 has two user input elements (here, left arrow button 320 and right arrow button 330) that provide instant access to a category of digital audio files. (The user input elements can take other forms, such as, but not limited to, a wheel, a lever, a switch, a knob, or a touch-sensitive element.) The two buttons 320, 330 act as "change channel" buttons, with the left arrow button 320 indicating "previous category" and the right arrow button 330 indicating "next category." When the circuitry in the digital audio player 300 receives a user selection of the left arrow button 320, it selects the previous category and plays a digital media file from that selected category. Consider, for example, a memory card 310 that has three categories ("Groove Boutique," "Classic Jazz," and "Modern Jazz" (of course, the memory card 310 can have more or fewer categories)), and the digital audio player 300 is currently playing a song from the "Classic Jazz" category. When the circuitry in the digital audio player 300 receives a user selection of the left arrow button 320, it selects the previous category, which, in this card, is "Groove Boutique," and plays a digital audio file from that selected category. In this way, no further user action is needed to play the digital audio file after user selection of the buttons 320, 330. (Instead of automatically playing a digital audio file from the selected category, the digital audio player 300 can be require the user to press a play button (not shown in the digital audio player 300 in FIG. 3) after pressing one of the "change channel" buttons 320, 330.) A similar operation would occur when the user presses the right arrow button 330, but the digital audio player 300 would play a song from the next category (e.g., "Modern Jazz") instead of the previous category (e.g., "Groove Boutique"). Accordingly, with this simplified user interface, a user can instantly access a category of digital audio files with the press of a single button, much like the user's experience with pressing a previous channel or next channel button on an FM radio.

Although not required, as shown in FIG. 3, the digital audio player 300 can provide other elements to enhance a user's experience with the player 300. For example, the digital audio player 300 in FIG. 3 comprises a display device 340 that displays the current category being played, as well as other information, for a richer experience. The digital audio player 300 also comprises additional user interface buttons such as a volume-up button 350, a volume-down button 360, a "skip song" button 370 (this player 300 does not have a "previous song" button, but one could be added), a switch 380 to select between "off," "card," and "FM" modes of operation. (In this embodiment, the digital audio player 300 also has an FM radio receiver. When in "FM" mode, the left arrow button 320 and the right arrow button 330 scan up and down the dial.) Other buttons, such as the ones discussed in the next embodiment, can also be added.

Figure 4:
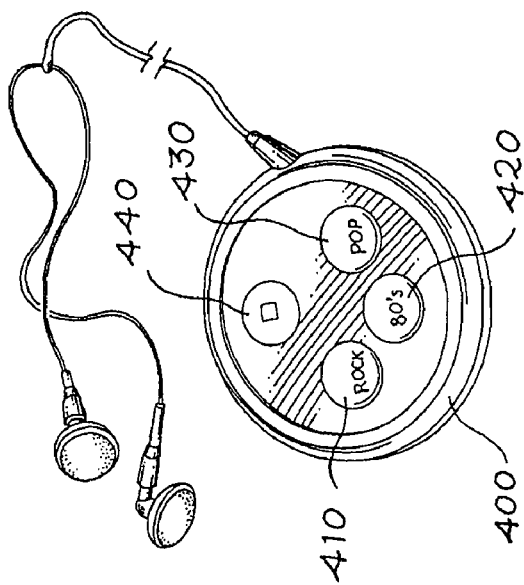
FIG. 4 is an illustration of a digital media player of an embodiment.

Instead of having next category and previous category user input elements, as in the digital audio player 300 shown in FIG. 3, a digital audio player can have dedicated user input elements that are configured to correspond to the plurality of categories. This alternative is shown in the digital audio player 400 in FIG. 4. As shown in FIG. 4, the digital audio player 400 has three buttons dedicated to three different categories: a "rock" button 410, an "80s" button 420, and a "pop" button 430 (of course, more or fewer buttons/categories can be used). These buttons 410, 420, and 430 operate similar to preset buttons on an FM radio to select designated channels. In operation, circuitry in the digital audio player 400 receives a user selection of one of the buttons 410, 420, and 430, selects the category corresponding to the selected button 410, 420, and 430, and then plays a digital media file from that category. As with the digital audio player 300 in the above embodiment, the digital audio player 400 can automatically play the digital audio file from the selected category, so no further user action is needed to play the digital audio file after user selection of the button 410, 420, and 430. Accordingly, the digital audio player 400 present a somewhat "optimal" solution to both of the challenges presented above in that the player 400 contains music grouped into simple categories (i.e., "Rock," "80s," "Pop") and can start playing music from those categories with a single button dedicated to those categories. Alternatively, the digital audio player 400 can require the user to press a play button (not shown in the digital audio player 400 in FIG. 4) after pressing one of the preset buttons 410, 420, and 430. The digital audio player 400 in FIG. 4 has a stop button 440 to stop operation of digital audio player 400. The stop button 440 and the digital audio player's 400 power management system will be described in more detail below.

As mentioned above, the category buttons 410, 420, 430 can be considered to be "dedicated" to the categories because selection of a category (and, in some embodiments, playback of a digital audio file from that category) is achieved by a single button press of one of the category buttons 410, 420, 430. However, a "dedicated" button can be permanently dedicated to a particular category or dedicated to a particular category only at a certain period of time. For example, buttons 410, 420, 430 can always be dedicated to the "Rock," "80s," and "Pop" categories, respectively, or only dedicated to those categories when the embedded memory or memory card in the digital audio player 400 contains digital audio files in those categories. Regarding the latter alternative, if the digital audio player 400 contains digital audio files in other categories (e.g., "Reggae," "Jazz," "90s"), the buttons 410, 420, 430 can be dedicated to those other categories. The buttons 410, 420, 430 can even have different, non-category-selection functionality in different modes of operation of the digital audio player 400. If such flexibility is desired, instead of physically printing category indicia on or near the buttons 410, 420, 430, as shown in FIG. 4, more generic indicia, such as "Channel 1," "Channel 2," "Channel 3," can be used. As another alternative, the buttons 410, 420, 430 can be configured via a bistatic display technology (e.g., eInk or Sipix) to allow the indicia on or near the buttons 410, 420, 430 to change as needed. The advantage of bistatic technology is that once the display is set, it retains its information without the application of power. This may be especially desired for a player that is normally in standby mode, as described below.

Figure 5:
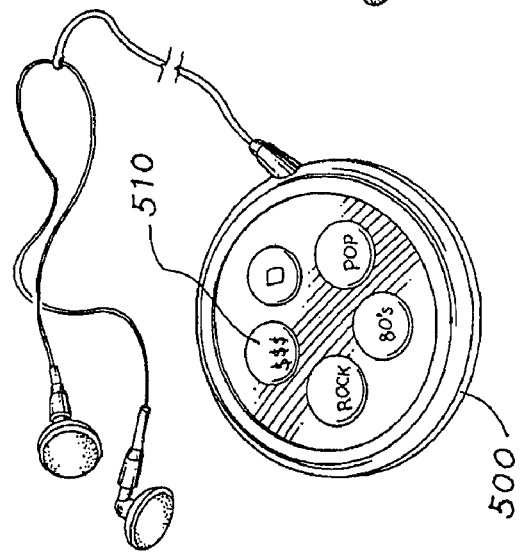
FIG. 5 is an illustration of a digital media player of an embodiment.

As noted above, although the digital audio player 400 in FIG. 4 is a very simple device with a minimal set of buttons and no display, additional user elements can be used. For example, as shown in FIG. 5, a digital audio player 500 can include a button 510 that will flag a particular audio track for later acquisition, either immediately (e.g., if the digital audio player 500 is network connected) or at a later time (e.g., when the digital audio player 500 is placed in communication with a host computer). This feature can be implemented in many ways. For example, the digital audio player 500 can store metadata associated with each audio object/file on the player 500. When the purchase button 510 is pressed, a flag is set in the metadata for that object/file. The next time the digital audio player 500 is connected to a host computer, the flag is checked by an application running on the host computer. As another example of an implementation, the digital audio player 500 can contain a list of audio objects that the user indicated a desire to purchase by pressing the purchase button 510. Again, when the digital audio player 500 is connected to a host computer, the list can be sent to an application running on the host computer, which manages the purchase of the content. In either implementation, the host computer can purchase the content using any suitable technique, such as the ones described in more detail below.

The use of purchased content can vary based on the implementation. For example, in one implementation, digital audio files stored in embedded memory or in a memory card can be hidden to the user. The purchase of a digital audio file can make the purchased digital audio file visible to the user. As such, the user could be able to copy the visible purchased digital audio file to a library of songs on a host computer. Alternatively, if the digital audio player itself stores a general library of songs, the purchased digital audio file can be placed in the library on the digital audio player, so the user can select the purchased digital audio file for playback at any time.

Figure 6:
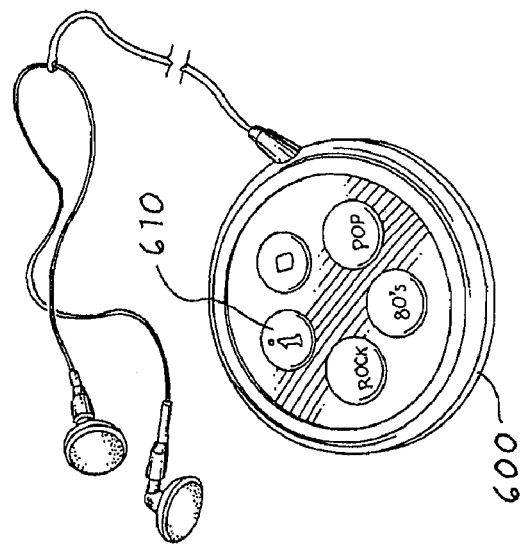
FIG. 6 is an illustration of a digital media player of an embodiment.

Another example of an additional user input element is shown in FIG. 6, where the digital audio player 600 includes an information button 610. By pressing this button 610, the user would request information regarding the digital audio file currently being played. This information can be retrieved immediately (e.g., if the digital audio player 600 is network connected) or at a later time (e.g., when the digital audio player 600 is placed in communication with a host computer). This feature can also be implemented using a flag or a list, as discussed above in conjunction with the purchase button 510 in FIG. 5. Of course, the additional user input elements shown in FIGS. 5 and 6 are merely examples, and other types of additional user input elements can be used.

Figure 7:
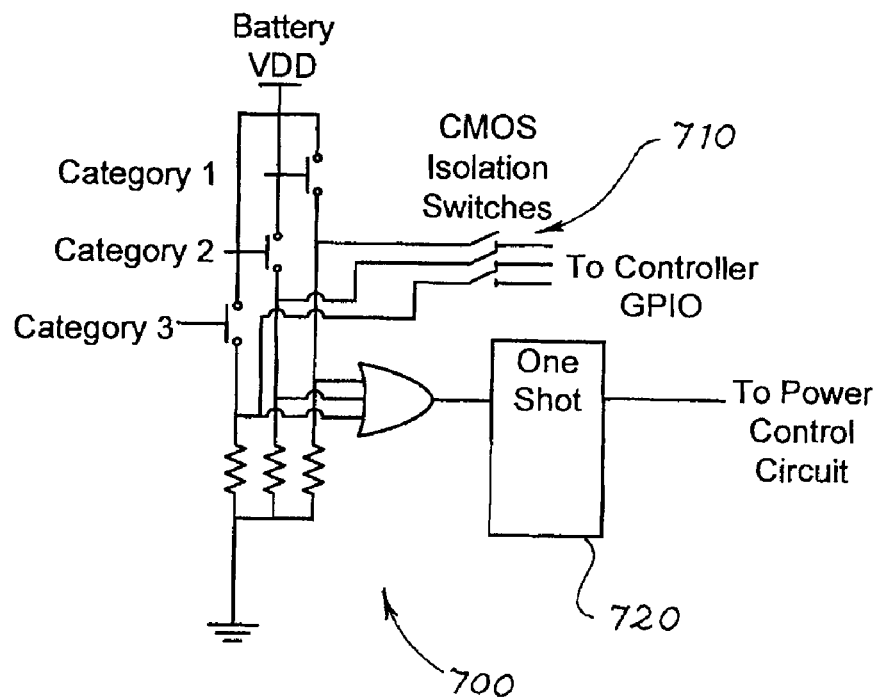
FIG. 7 is a circuit drawing of a digital media player of an embodiment.
Figure 8:
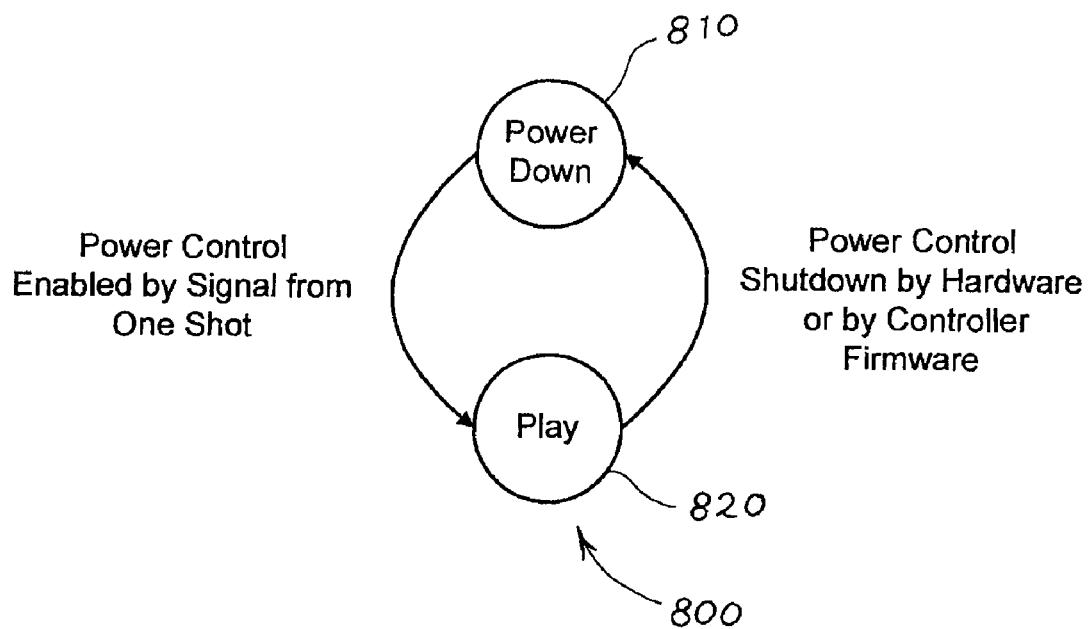
FIG. 8 is a state diagram illustrating the power mode operation of a digital media player of an embodiment.

As mentioned above, the stop button of the digital audio player can be used not only to stop playback of a digital audio file but also to select a power mode of the digital audio player. More specifically, instead of having a separate off or standby button, the stop button can be used to both stop playback of a digital audio file and to place the digital audio player in a standby state. In standalone operation, the digital audio player sits in a standby state until the user presses one of the category buttons. This maximizes battery life and removes the need for an on/off switch. When a user presses the stop button again, the digital audio player will return to the standby state. This will be illustrated below in conjunction with the circuit diagram 700 of FIG. 7 and the state diagram 800 of FIG. 8. As shown in the circuit diagram 700 of FIG. 7, when one of the category buttons is pressed, a corresponding one of the CMOS isolation switches 710 is closed, allowing the battery VDD to power the "one shot" component 720, which provides a controlled-timed pulse (e.g., a square wave) to the power control circuit. A signal is also sent to the controller GPIO to inform it which category button the user pressed, so the digital audio player can play a digital audio file from the selected category. With reference now to the state diagram 800 in FIG. 8, when the digital audio player is in a power down state 810, the power control of the player is enabled by a signal from the one shot component 720. When the digital audio player is in a play state 820, the power control is shutdown by hardware or by controller firmware in response to the stop button being pressed. When the digital audio player is connected to a host computer, the digital audio player can automatically detect the connection and exit standby mode. A battery charger can be attached to the digital audio player to charge the battery, which is detected separately from an active host interface, and the digital audio player could stay in standby mode while charging occurs.

It should be noted that categories of digital audio files can be provided to a digital audio player in any suitable manner. For example, in the embodiment shown in FIG. 3, the digital audio player 300 received categories of digital audio files from a removable memory card 310. In other embodiments, such as with the digital audio players 400, 500, 600 of FIGS. 4-6, the categories of digital audio files are provided via a host computer or a network location. In these embodiments, the digital audio files are grouped into a category by a curator of the category before the digital audio files are provided to the digital audio player. (As will be described in more detail in the following sections, a curator of a category can also be responsible for placing or specifying criteria for advertisements to be played during playback of digital audio files from that category.) By having a curator select digital audio files for a category, the user does not need to worry about identifying and selecting particular audio tracks for download onto his digital audio player. This should alleviate the frustrating experience that some users have with the current music downloading paradigm.

Digital audio files can be grouped into categories in any suitable way. For example, the curator can use a playlist file (or object) or a set of files (or objects) that specifies a play order of digital audio files in a category. The audio files/objects can also contain metadata specific to the buttons on the player. The player then can sequence through a single library of audio tracks according to the category that corresponds to a selected button. The curator can make the correlation before the digital audio files are provided to a host computer for downloading to a digital audio player, or the host computer can be enabled to make the correlation based on information from the curator. For example, if each category in the digital audio player is associated with a respective subdirectory, the host computer can be operative to store digital audio files into the appropriate subdirectories based on information from the curator. Alternatively, the end user can be the curator and can correlate digital audio files with categories using any of the above-described techniques. For example, the end user can create various playlists, download them to his digital audio player, and then use a category selection button to select from one of the playlists, or can store digital audio files into various subdirectories on the digital audio player.

Regarding the use of playlists, a playlist is a purposefully-curated set of audio files. As noted above, a playlist can take the form of an additional piece of metadata or a separate file. It should be noted that a playlist is separate from and in addition to the directory information relating to the digital audio files. For example, if digital audio files are placed in a folder, the files in that folder can be played in a specific order (e.g., alphanumeric order of the directory listing of the folder). If one were to use directory information to purposefully sequence the playback of digital audio files in a folder, one would need to rename the files to ensure the desired playback order. That can be very time consuming and tedious when a large number of files is involved. Using a playlist solves this problem, as the playlist is an additional piece of data that supersedes the file name. Accordingly, the use of a playlist provides ordering flexibility without manipulating file names in a directory. Playlists also allow one to repeat the playback of audio files without first playing all of the songs in a directory. In some situations, the audio files in a playlist are specifically ordered to create a certain listening experience or for advertising purposes. The use of playlists for this function will be discussed in more detail in the following section.

Embodiments Relating to Ad-Supported Digital Content

As discussed above, by having a curator select digital audio files for a category, a user does not need to worry about identifying and selecting particular audio tracks for download onto his digital audio player. This should alleviate the frustrating experience that some users have with the current music downloading paradigm. As also discussed above, a user can purchase a memory card pre-loaded with categories of digital audio files or can purchase and download categories of digital audio files from a digital audio file source, such as a store on the Internet or a kiosk. However, to make the experience more FM-radio-like for the user, instead of charging the user for the digital audio files, the digital audio files can be distributed for free (or at a reduced charge) by playing advertisements before, during, or after the playback of a digital audio file. Such digital media files will be referred to herein as "ad-supported digital media files." A digital content owner can use the revenues generated from selling ad space to advertisers to offset the cost of the digital content, thereby allowing the digital content to be distributed to the user for free (or at least at a reduced rate). This is similar to the experience a user has with FM radio, where the user is allowed to listen to songs on the radio for free due, at least in part, to fees generated by the radio station selling ad space to advertisers. (If digital content is being provided on a portable memory card, the ad-supported model can be used to reduce the price of the card, so the user is effectively paying for the memory card itself and not for the digital content stored on the card.)

As used herein, an "advertisement" (or "ad") is digital content designed to attract attention or patronage. An advertisement can take the same or different form as its associated digital content. For example, if the digital content is audio, the advertisement can also be audio or, if the digital media player has a display screen, the advertisement can be video or text. An "advertisement" can be, but need not be, directed to a product or service. For example, an "advertisement" can be a commercial for a product or service, a public service announcement, a station or channel identification spot, or an identification of an owner of the digital content. As will be described in more detail below, the advertisement can come from the same or different location as the digital content and can be downloaded at the same or different time as the digital content. Advertisements can be stored on the same or different memory from the digital audio files.

With an ad-supported/free content model, a user can have a music experience that is liberated from the onus of selecting individual content and building individual playlists. Rather, external sources will be responsible for the building of music libraries and then sequencing the content from these libraries according to the guiding principles of the category to which the sequence belong. Although the advertisements can be chosen by any desired entity, in one presently preferred embodiment, advertisement decisions (e.g., the selection of advertisements, the criteria for advertisements, advertisement placement, etc.) in a given category are made by the curator of that category (e.g., the entity that selects and organizes the digital audio files in that category). This provides the user with a "unified" experience, much like the user experiences when listening to FM radio.

Any suitable mechanism can be used to play advertisements during playback of digital audio files in a category. For example, the curator of a category can include advertisements in a playlist that contains the sequencing order of digital audio files. With this approach, the digital audio player would play the advertisements and the digital audio files in the order specified in the playlist. In another mechanism, instead of manually building a playlist with advertisements, rules (i.e., an advertisement handling algorithm) can be used to make it easier for the category curator to blend advertisements and digital audio files. The use of rules allows more flexibility in terms of the selection and sequencing of advertisements during playback of digital audio files. The component used to run the advertisement handling algorithm can be circuitry (e.g., a processor) in the digital audio player or, if a memory card is used, can be circuitry (e.g., a processor) in the memory card (a distributed approach is also possible). In one embodiment, metadata associated with advertisements and/or digital audio files is used in conjunction with the rules to decide how to load ad content, how to sequence ad content with other audio data, how to keep ad content current, and how to report to a host what ad content has been experience by a user.

In general, content objects can be transferred from a host device or network to the digital audio player via an object-oriented interface, such as MTP or File Based Command Channel (FBCC). With this object comes metadata describing certain aspects of the data. Standard audio products include metadata such as artist name, album, title, album art, and lyrics. This embodiment uses an enhanced set of metadata to manage the various media and advertisement content used in a digital audio player (e.g., by using the metadata in conjunction with rules to determine which advertisements to play during playback of digital media files). For example, a playlist for a category can comprise a parameter that specifies at least one advertisement to play during playback of digital media files in that category, where that parameter specifies at least one metadata (or other) requirement of an advertisement to be played during playback of digital media files in that category. An enhanced set of metadata can include, but is not limited to, the following:

Revenue Content (RC) Flag: This is a flag indicating that content is revenue related and that RC-specific rules should apply to its use.

Public Service Announcement (PSA) Content Flag: This is a flag indicating that content is public-service related and that PSA-specific rules should apply to its use.

Revenue/PSA Parameters: These are parameters used to influence the rules of processing revenue or public service content (e.g., time of date for airing, beginning or end date of rotation, proximity profile, required playback frequency, ad sponsor, product name, etc.).

Station Identification (SI) Flag: This is a flag indicating that content identifies the station and that SI-specific rules should apply to its use.

SI Parameters: These are parameters used to influence the rules of processing SI content (e.g., time to air, etc.).

Content Purchase: As discussed above, a digital media player can have a user input element (e.g., a button) that, when pressed, indicates a user's desire to purchase audio content. The metadata associated with the content can contain the URL necessary to purchase the content itself, or, if the content is revenue content, it could have the information necessary to purchase the advertised product (e.g., URL, SKU, special offer info, etc.).

Leader Audio: Leader audio is intended to be used much as DJ squawk introduces a song to give a more radio-like experience.

Factoid data: This data is intended to be used if the digital media player has a display device for providing interesting information related to the content being played. This data can have embedded text, photos, or even video.

Transport control restrictions: During the playback of RC or a PSA, device transport controls (e.g., stop, category/genre selection, fast forward, skip, etc.) can be disabled to ensure the RC or PSA plays in its entirety. If a digital audio player supports a rewind function, the player may allow RC or a PSA to be instantly replayed.

By using a playlist that has enhancements that support the insertion of advertisements (e.g., revenue or public service announcement (PSA) content), rules can be used that specify, for example, precisely what ad or PSA to play, or an ad that both fits the proximity profile or other specific metadata requirements (e.g., sponsor, product, etc.) and is active within the current time/date window as indicated by its metadata parameters. Alternatively, parameters can be used that specify how ad content should be inserted (e.g., how many minutes/hour), and then an advertisement handling algorithm (e.g., in the digital audio player or in the memory card that stores the digital audio files and advertisements) can determine which ads or PSAs get played algorithmically. Although it may be preferred to handle station identification algorithmically, there is no limitation for a playlist to specify the precise point in a content sequence that a certain station identification should be played. The advertisement handling algorithm can also be capable of managing normal content based upon parameters as well (e.g., hot clock rotations, etc.). If the advertisement handling algorithm has access to a real-time clock and the advertisement is specified to play only at certain times, the advertisement handling algorithm can target RC and PSAs to playback only during their target windows. Priority can also be given to other parameters, such as a requirement to play an ad a minimum number of times per hour.

In operation, the digital audio player can have a content database, which stores all the songs and the metadata (e.g., album art, info on artist, etc.) for the songs, as well as advertisements. The playlist is separate from the content database and refers to a file object. That object handle will also have an entry in the database. So, when the playlist specifies that a certain piece of content is to be played, the circuitry in the player queries the database, sees that piece of content, and looks at its metadata to tell what it is and what rules apply in order to meet certain ad-placement goals. As mentioned above, automatic insertion of ads/public service announcement can be governed by playback rules. On power-up, circuitry in the player looks at the database, sees the content and the ad requirements, and works the ads into the playback of the playlist. Also, the rules can trump a playlist; if the rules say that public service content needs to be played next, the public service content would be played next even if the playlist specifies that a song should be played next.

To show advertisers that they are getting value for purchasing advertisement space in a category, it may be preferred to track usage activity of the advertisements (and other information), which can be later reported back to the advertiser or other entities. Usage activity can be tracked while the player is offline through the use of metadata and reported back to an external entity when the player is connected to a host computer or network. As used herein, the term "usage activity" refers to any activity relating to the asset being tracked. Usage activity can include, for example, whether an asset was played (either partially or in its entirety), the number of times the asset was played (i.e., the "play count" of the advertisement), the amount of time spent playing an asset, whether the asset was skipped in its entirety, whether and how many times the asset was replayed, whether a fast forward or rewind operation was used during the playback of the asset, user rating of the asset, the time the asset was played, information about the user who consumed the asset, information about the host device used to consume the asset, any survey information that may have been requested and answered, etc.

As mentioned above, in this embodiment, similar to devices that support WM-DRM, the digital audio player supports round-trip metadata to enable tracking the user's operation of the player and the viewing of content thereon. Such metadata can include play counts that can be used to determine market coverage of an advertisement, play counts for audio content, and skip counts that can be used to infer dissatisfaction with a particular track. For devices with a more sophisticated user interface, user ratings can also be supported for both audio and revenue content. When a digital audio player is connected to a host system, content on the player can be enumerated to the host. Roundtrip metadata for the existing device can then be uploaded to the host for processing by a host application or transfer over the Internet. (As mentioned above, metadata associated with content can also be used to facilitate user-initiated purchase activities upon synchronization.) Based upon a number of factors (e.g., user genre/channel preferences, updated genre playlists, updated RC or PSAs, etc.), existing device-held content can be erased, and new content can be added to the device by the host. More information about the network infrastructure is provided in the following section. Additional information about advertisement tracking and related embodiments that can be used in conjunction with these embodiments can be found in U.S. patent application Ser. No. 11/973,871, which is assigned to the assignee of the present application and is hereby incorporated by reference.

Embodiments Relating to an Exemplary Network Infrastructure

In many of the above embodiments, a digital audio player was described as being used in conjunction with a network infrastructure of many networked components that together create a system by which a rich category-based audio experience is created. The following paragraphs describe an exemplary network infrastructure that can be used to provide both ad-supported and paid content to portable media players or other devices, such as PCs. Some of the features supported by the exemplary network infrastructure include, but are not limited to, delivery of an ad-supported audio content group from a content provider to a portable device, a mechanism to upgrade services levels from a free ad-supported model to a premium ad-free model, a mechanism to license a portable device to a particular content provider's services and to distribute the appropriate decryption keys to the content provided by such services, and a mechanism to use data from the device to better tune the content creation algorithm to user preferences. This infrastructure can also be used to deliver content, both genre and ad varieties, support eCommerce, and provide the users of the system with a satisfying, seamless cached-Internet radio experience.

Figure 9:
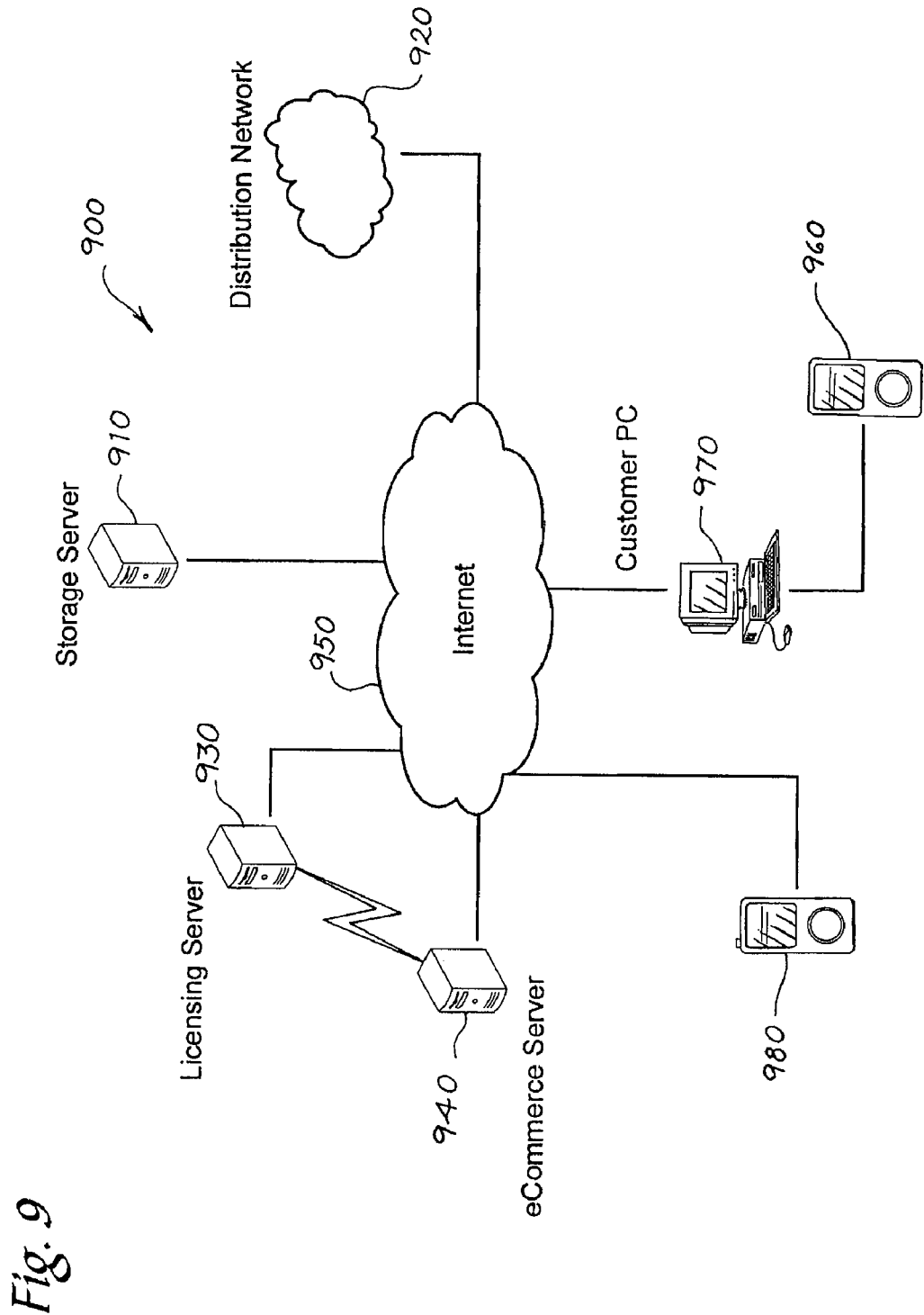
FIG. 9 is an illustration of a network of an embodiment.

Turning again to the drawings, FIG. 9 is an illustration of an network infrastructure 900 of an embodiment. As shown in FIG. 9, this infrastructure 900 includes one or more storage servers 910, a content distribution network 920 (e.g., Akamai), one or more licensing servers 930, an eCommerce server 940, the Internet 950, and a portable digital audio player 960 in communication with the Internet 950 either indirectly though a host computer 970 with a network connection to the Internet 950 (e.g., running an application or hosting a web-based application (e.g., via ActiveX)) or directly if the digital audio player comprises a wireless transceiver (such as digital audio player 980, which has Wi-Fi capability). Of course, other or different architectures are possible, as the various functions of the shown components can be separated or combined. Also, this infrastructure 900 can be used to provide both ad-supported and paid content to a portable media player or other devices, such as a PC.

The storage server 910 stores digital media content, such as, but not limited to, audio content (e.g., songs, news, podcasts, etc.), advertisements, public service announcements, and category/station/channel/genre ID spots, some or all of which can be encrypted. The storage server 910 also has additional functionality, which will be described below. The content distribution network 920 is located over a large geographic region to facilitate downloading of digital media. The license server 930 is operative to authenticate a device (e.g., a digital audio player or a PC) and subsequently provide the device with encryption keys according to a list of services to which the device is authorized. A directory server (not shown) in the network 950 can direct a device to the appropriate licensing server, if more than one licensing server is used. The eCommerce server 940 can be used to purchase premium paid services for a specific device and communicates to the license server 930, which governs permissions to devices.

In addition to merely storing content and advertisements, the storage server 910 can act as a "category creation entity." In general, the category creation entity is responsible for assembling data in the storage servers into groups coherent to a specific category, at least some of which is in a particular sequence (e.g., creating a playlist and/or advertisement rules for a category). Such groups can be generic in nature or personalized to a particular device or user of the system. The entity receives notification from the licensing server 930 that a particular device is authorized for one or more groups, whereupon the group along with any relevant sequence information is passed to the device 960 via the network(s) 920, 950. The storage server 910 can be operated, for example, by a media company, a digital audio player/memory device company, or by joint operation between the two companies. In the later alternative, advertisements and content decisions can come from one or both of the companies.

The following example will illustrate the operation of this infrastructure 900. In this example, all content files are encrypted and, in addition, will not be directly visible to a PC either via a standard USB connection or by removing the memory and attaching it to a PC via another mechanism (e.g., an SD card reader). Instead, the content is only visible after an authentication process between the PC 970 and player 960 has been completed under the control of an application in the storage server 910 that is responsible for the update of the category content. Accordingly, in this embodiment, for all server-player communications, communication with the player/memory card is only possible after a secure session is established through an authentication process.

In this example, a user would like to get a new or updated category of digital audio files. Referring again to the FM radio analogy, just as an FM channel does not repeat the exact same playlist of songs time and time again, it is preferred that content in a category be updated. Refreshing content (and advertisements) in a category allows the experience to be more like listening to FM radio. (The content that is to be refreshed could have been previously downloaded from the network or could have been pre-loaded content in a memory card.) In operation, the user connects his digital audio player 960 to the Internet 950, and a directory server in the Internet 950 directs the connection to the licensing server 930, which identifies the appropriate storage server 910 for the player 960. (It is preferred that the identified storage server be "near" the user to ensure good performance; hence, the use of the distribution network 920.) After the appropriate storage server 910 is identified, the storage server 910 (directly or through the distribution network 920) sends new content to the player 960 to refresh all of the content in a category, refresh only the "stale" content in a category (e.g., "stale" as identified in the play count metadata of individual digital audio files), add a new category of content, etc. In some situations, player 960—storage server 910 interaction takes place without user involvement. For example, the storage server 910 can automatically refresh content in a category when selection of specific content objects is managed by a content management entity, which works in conjunction with the content stored on the storage server 910. In such a situation, the content is not directly selected by the end user. The user merely selects which services the content creation entity should make available. In other situations, player 960—storage server 910 interaction requires user involvement, such as when a user selects particular pieces of content for download.

As mentioned above, in this embodiment, pieces of content on the storage server 910 are encrypted and have various restrictions/permissions associated with them. Accordingly, in addition to contacting the storage server 910, the player 960 authenticates against the licensing server 930 to get the appropriate decryption keys and permissions/rights for the downloaded content. A decryption key allows the player 960 to decrypt encrypted content, and permissions/rights tell the player 960 what content the player 960 can access and under what terms. For example, if the user only has an ad-supported subscription to content, the licensing server 930 can make sure that the player 960 only performs those operations that are appropriate for ad-supported content (e.g., playback only and no copying; playback based on time, etc.). Preferably, the player 960 receives a license and set of content keys that are relevant to all content provided by a given service, not individual content keys for specific objects. Playback of the downloaded content on the player 960 is then done based on the license terms. (Even though the player 960 has the ability to directly render the content (i.e., play it back without the PC 970), if the PC 970 is used to connect the player 960 with the Internet 950, the PC 970 can optionally be licensed to play content from a given service as well.)

In a presently preferred embodiment, a TrustedFlash™ architecture from SanDisk Corporation is used to store the decryption keys and licenses in a hidden partition in memory, while storing the encrypted content in a hidden (or, alternatively, public) public partition in memory. Further information about TrustedFlash™ can be found in U.S. patent application Ser. No. 11/314,411 (published as U.S. patent publication 2006/0242068A1), Ser. Nos. 11/557,028, and 11/322,812 (published as U.S. patent publication 2007/0043667A1), which are assigned to the assignee of the present application and hereby incorporated by reference.

In some situations, a user can purchase specific content, such as by pressing a purchase button on the player 960 (as discussed above) or by selecting "a la carte" content from a menu. A user may also decide to purchase a premium channel that does not require the user to consume ads along with his digital audio files. In situations such as these when a purchase is made, a connection is made to the eCommerce server 940 to process the appropriate payment and make an accounting to a third party for royalty share. The eCommerce server 940 would also communicate with the licensing server 930 via a secure channel to set license eligibilities. In this way, after purchase, the licensing server 930 can provide the player 960 with expanded permissions/rights for that content.

This network infrastructure 900 can also be used to provide additional services. For example, a target advertisement creation mechanism can be used, which creates ad content and also governs the parameters of it employed within the system. Such mechanisms would have a unique advantage in targeting single-user portable digital audio players. As another example, customized extensions to the algorithms applied by content management entities can enable "custom" content services, which can be optionally chosen by end users. This allows a user not only to select specific genre- or category-based content but also personalized content (e.g., "Jimmy's Bellarmine Lunchtime Mix"). The content management entity (and the host PC interface, if present) can also be responsible for processing any roundtrip metadata received from a particular device. The processing of this metadata can include, but is not limited to, the following:

- Tracking play counts, skip counts, and user ratings of particular audio content. This information can be used to refine the selection of content for future device synchronization for an improved user experience through better targeting content.
- Tracking play counts, times, and dates of advertisement or PSA content. Such information would be useful in the creation of extremely targeted advertising. It could be used for billing purposes, for market research surveys, and ad-effectiveness studies (e.g., tracking buy behavior against play times).
- Processing purchases or other requests for services made directly from the device. Such requests can be triggered by the user in response to ad content stored on the device. Data to the content management entity would include relevant product and order processing information. Alternatively, another server could be employed to process such requests (e.g., directly to another eCommerce entity).

Additional information about a network environment and various methods that can be used with these embodiments can be found in U.S. patent application Ser. No. 11/973,871, which is assigned to the assignee of the present application and is hereby incorporated by reference.

Embodiments Relating to a Generic Streaming Content File Interface

In some of the above embodiments, a digital audio player was discussed that plays a predetermined set of songs in a sequence according to a set of user criteria. Such a player will be referred to herein as a "powerfully simple" player/product/device. The set of songs played by the player are not specifically selected by the user but certain attributes of the music category are, such as genre or artist. The paradigm of the player is similar to FM radio; that is, the user selects a channel and then just listens. The player differs from an FM radio in that the music is stored in the player's memory, which is embedded memory and/or one loaded into a card slot. The player differs from other players in that it is not necessary or even desirable for a user to access the individual song files stored on the memory. To the contrary, it is desired that the song files be concealed from the user. On a player with embedded memory, this can be done by hiding content in a partition not visible when the player is connected to a computer. However, an issue may arise when the song files are stored on a memory card instead of embedded memory. Using standard memory cards for holding such files would mean that the music file contents would be visible when the card is inserted in a PC card reader or other device equipped with a card slot. While it is desirable to hide the individual files under such circumstances, it is also desirable to allow other products the ability to playback this content even while the music files themselves are not visible using standard playback infrastructures, such as Windows Media Player or MP3-enabled mobile phones.

One possible approach is to use the TrustedFlash™ platform discussed above. With such a platform, files designated to be kept private are hidden in a private partition of the storage medium, and a special API is then used to access the protected content. However, this means that memory cards can only be accessed in devices that support the API or that special software needs to be loaded onto the device to provide such functionality. In the case of card-based devices that can play audio content natively that do not support TrustedFlash™ or software which does, the opportunity for playing back the content on the card is lost. The following embodiments address this situation. In general, with these embodiments, a card contains song files that are not presented to a host device in which the card is inserted. Instead, the card presents a virtual file system image that appears to contain a generic file representation of a category of songs. When the host reads the generic file, the device sends data from one of the song files from the category in a way that the host device will interpret the data as part of an encoded music file that can then be played back using standard playback applications.

Figure 10:
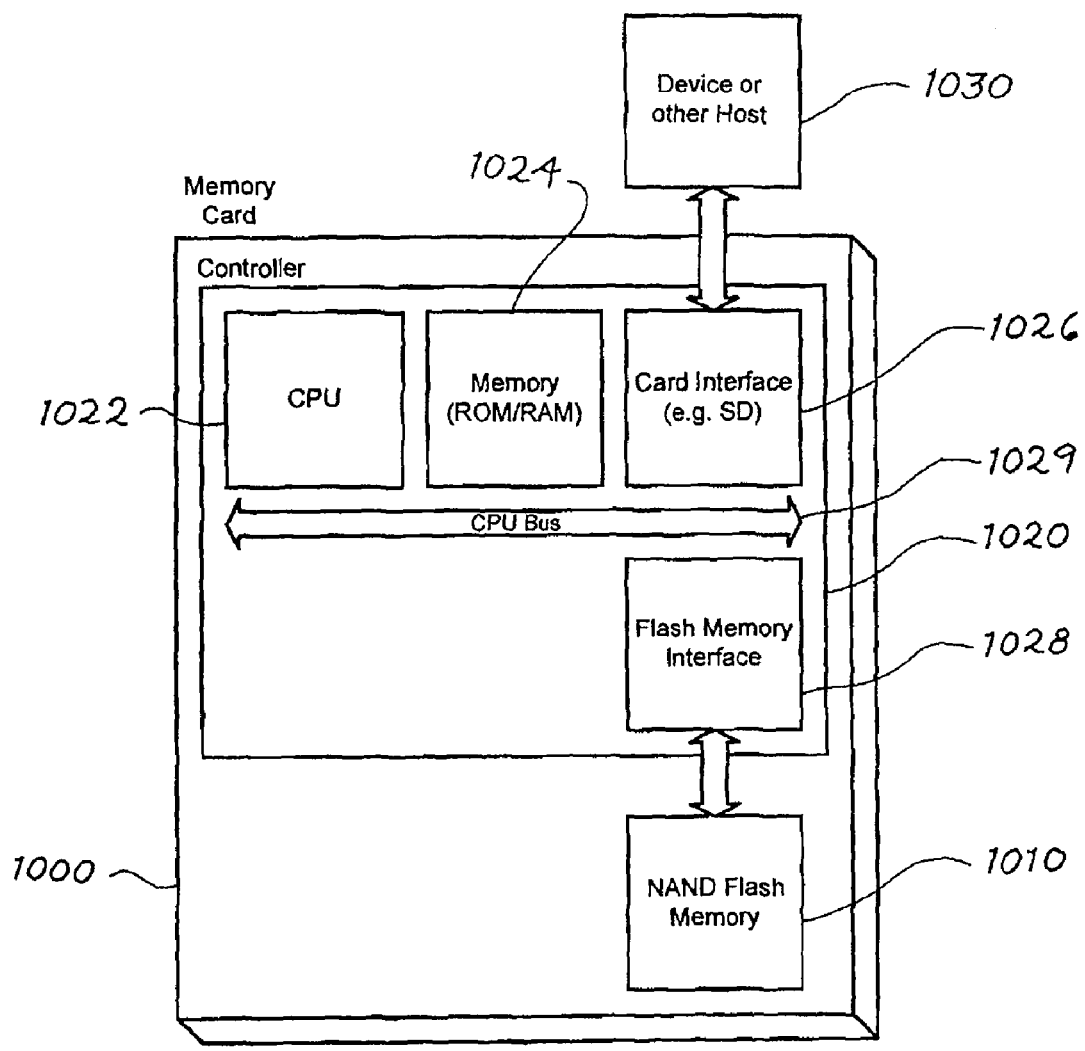
FIG. 10 is an illustration of a memory card of an embodiment.

Returning to the drawings, FIG. 10 is an illustration of a memory card 1000 of an embodiment. As shown in FIG. 10, the memory card 1000 comprises a memory 1010 and a controller 1020. In this embodiment, the memory 1010 takes the form of NAND flash memory composed of erasable blocks of nonvolatile cells that are readable and programmable in smaller units of pages, although other memory types can be used. The controller 1020 is preferably implemented as a single integrated circuit that may or may not be packaged with the NAND memory 1010. The controller 1020 comprises a CPU 1022, a memory (ROM/RAM) 1024, a card interface (e.g., SD) 1026, a flash memory interface 1028, and a CPU bus 1029. The controller 1020 is responsible for translating requests for data transfers from a host 1030, which are generally of read or write variety and specify a starting logical block address and a number of blocks to transfer. In standard memory cards, the controller generally does not read and interpret the data that the host writes to the card. In this case, the controller 1020 does interpret the file system and recognizes the location and format of audio files stored on the card 1010. The format of these files and operation of the card 1000 will be illustrated in the following paragraphs and in conjunction with FIGS. 11-14.

Figures 11, 12:
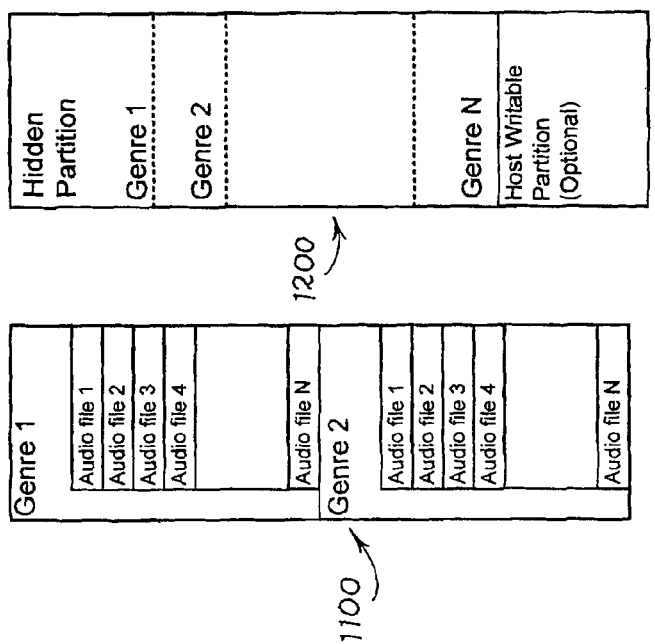
FIG. 11 is an illustration of a general representation of two categories of audio files of an embodiment.
FIG. 12 is an illustration of a file system organization of a memory card of an embodiment.

Turning first to FIG. 11, FIG. 11 shows a general representation 1100 of two categories (here, genres) of audio files: Genre 1 and Genre 2, each with N audio files. FIG. 12 shows a file system organization 1200 for storing these two genres. The file system 1200 is partitioned into one or more hidden partitions containing audio files. These partitions can either be partitioned into multiple partitions, one for each genre, or into only one partition for genre files but with database records or playlists indicate which files belong to which genres. In either case, there may also be one partition for storing host files, which is stored as a logical volume that is directly writable by the host. The hidden partition contains partition records indicating locations of all partitions, each partition containing a file directory and allocation of clusters. The host writable partition contains standard host file system augmentation with directory entries and cluster allocations for each of the streaming files.

Figure 13:
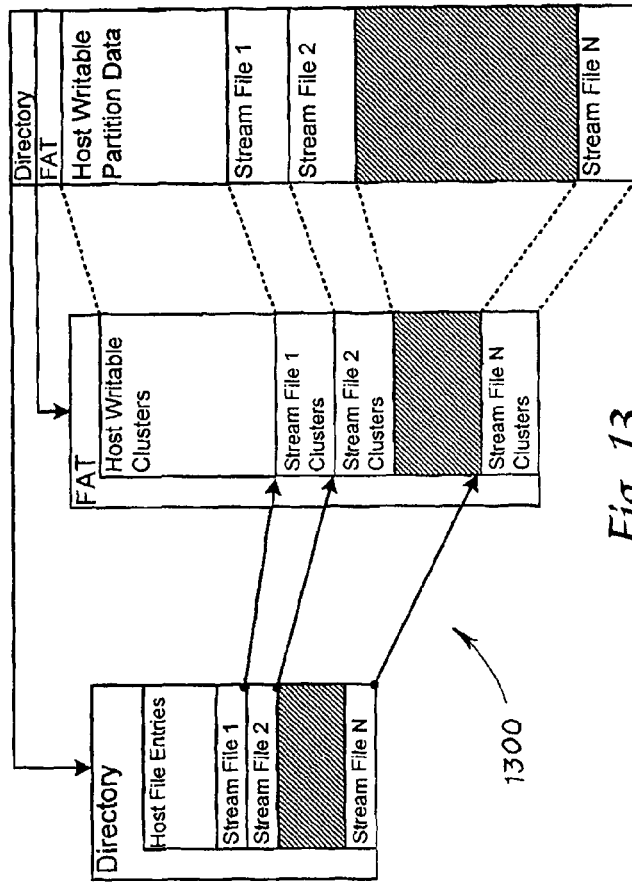
FIG. 13 is an illustration of an externally-presented file system of an embodiment.

FIG. 13 is an illustration of an externally-presented file system 1300 of an embodiment. The file system 1300 presented to the host artificially represents each of the genre groups of files as a single file, each equal to the total size of all the audio files within each of the respective genres. If there is a directly-writable host partition, the file system contains a direct cluster map of the host files, offset by the size of the total number of clusters that would be equivalently occupied if there actually were large genre files stored in that partition or without an offset and the genre files offset by the clusters allocated to the host writable clusters.

Figure 14:
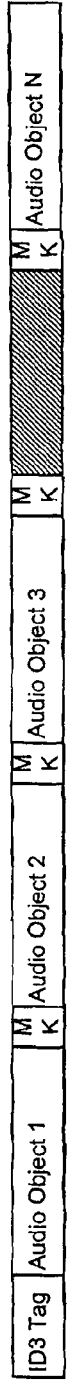
FIG. 14 is an illustration of a generic streaming file format of an embodiment.

FIG. 14 is an illustration of a generic streaming file format 1400 of an embodiment. The format of the data is such that when a standard MP3 application reads it, it can identify metadata in an ID3 tag followed by a stream of audio data. Each audio object is marked with an object marker (MK) indicating a boundary but, when played as part of the MP3 stream, creates no audible sound. These markers are undetectable by the MP3 application but, to the digital media player application, signal the boundary between objects. When the ID3 data is read the first time, metadata describing the group of files is presented. The controller detects subsequent read operations and, each time, presents data which, in sequence, describes each audio object upon each subsequent read operation.

In summary, the protected files stored in a hidden partition of a memory card 1000 are not presented to the host device. Instead, the memory device 1000 presents a generic file system image with a single, very large file (e.g., genre-stream.mp3) that a host device can access. The file is preferably large enough that hours of music could be played with the host application only playing the file once. The file system view is virtual and does not represent an actual file system. If a host device attempts to write to clusters that appear free in this file system image, the memory card 1000 may either reject these as if write protected or support a second tier file system, which supports actual write activity and integrates actual files with the artificial file system view. The protected file data is presented to the host device as the host device requests data clusters from the genrestream.mp3 file. Audio object markers can be provided as part of the audio stream, such that no audible effect is created by their presence, but that a digital media player can detect the boundary between audio objects. Existing techniques for embedding digital data into audio streams (e.g. watermarking) could be used for this purpose. Metadata for the content is presented as ID3 tag data embedded within the file data. Since this data will only be read once for the file access by other types of digital media players, this data would preferably contain metadata applicable to the entire category. When loaded in a digital medial player of these embodiments, the location of the ID3 data could be re-read every time a new audio object marker is detected. In this manner, specific song-related metadata can be presented to the user.

There are several alternatives that can be used with these embodiments. In one alternative, multiple large files can be used, for example, if multiple types of streams are loaded onto the device (e.g., jazz.mp3, classical.mp3, rock.mp3, etc.). It should be noted that MP3 is being used herein as an exemplary compressed music format and that the actual formats can include one of many different types of compression (e.g., ACC, MP3, WMA, etc.). Also, as noted above, while digital audio is being used to illustrate these embodiments, other types of streaming data, such as video and spoken word content, can be used. In another alternative, standard mass storage class operations (e.g., LBA write and LBA read) could be supported for cluster addresses not occupied by the streaming file. If a host deleted the streaming file, the card could revert to a standard mass storage class card, deleting all protected content. Further, a streaming file could employ a technique for preventing high-speed content by only allowing small portions of the file to be read at a given time. Large read operations could be stalled with busy periods, or spurious data could be sent that did not represent protected content. Also, as noted above, any suitable type of memory can be used. For example, instead of using a reprogrammable non-volatile memory, such as NAND flash, a one-time programmable memory can be used.

CONCLUSION

It is intended that the foregoing detailed description be understood as an illustration of selected forms that the invention can take and not as a definition of the invention. It is only the following claims, including all equivalents, that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A portable digital media player comprising:
    a connector configured to be removably connected with a memory device, wherein the memory device comprises a memory pre-loaded with digital media files grouped into a plurality of categories, wherein all digital media files stored in the memory that are playable by the portable digital media player are grouped in one of the plurality of categories, and wherein the digital media files are provided to the digital media player via the memory device without requiring a connection to a network;
    a plurality of user-pressable user input elements;
    an audio output element; and
    circuitry in communication with the connector, the plurality of user-pressable user input elements, and the audio output element, wherein the circuitry is operative to:
        receive a user selection of one of the plurality of user-pressable user input elements;
        select a category from the plurality of categories in response to receiving the user selection; and
        play a digital media file from the selected category.

2. The portable digital media player of claim 1, wherein the memory is free of a general digital media file library outside of the plurality of categories.

3. The portable digital media player of claim 1, wherein the plurality of user-pressable user input elements comprises a next category user input element and a previous category user input element.

4. The portable digital media player of claim 1, wherein the plurality of user-pressable user input elements are dedicated to the plurality of categories.

5. The portable digital media player of claim 1, wherein the memory comprises a solid-state memory in a memory card that is removably connectable with the portable digital media player.

6. The portable digital media player of claim 1, wherein no further user action is needed to play the digital media file after user selection of the one of the plurality of user-pressable user input elements.

7. The portable digital media player of claim 1 further comprising an additional user-pressable user input element, wherein the portable digital media player enters a standby mode in response to user selection of the additional user-pressable user input element, and wherein the portable digital media player exits the standby mode in response to user selection of one of the plurality of user-pressable user input elements.

8. The portable digital media player of claim 1, wherein a digital media file is grouped into one of the plurality of categories before the digital media file is provided to the portable digital media player.

9. The portable digital media player of claim 1, wherein a playlist specifies a play order of digital media files in each of the plurality of categories.

10. The portable digital media player of claim 1, wherein information associating the digital media file with the one of the plurality of categories is stored in a file separate from the digital media file.

11. The portable digital media player of claim 1, wherein each of the plurality of categories is associated with a respective subdirectory, and wherein a digital media file is grouped into a category by storing the digital media file in a subdirectory associated with that category.

12. A portable digital media player comprising:
- a connector configured to be removably connected with a memory device, wherein the memory device comprises a memory pre-loaded with digital media files grouped into a plurality of categories, wherein the plurality of digital media files are provided to the digital media player via the memory device without requiring a connection to a network;
- a plurality of user-pressable user input elements configured to correspond to the plurality of categories;
- an audio output element; and
- circuitry in communication with the connector, the plurality of user-pressable user input elements, and the audio output element, wherein the circuitry is operative to:
  - receive a user selection of one of the plurality of user-pressable user input elements; and
  - play a digital media file from a category corresponding to the selected one of the plurality of user-pressable user input elements.

13. The portable digital media player of claim 12, wherein the memory is free of a general digital media file library outside of the plurality of categories.

14. The portable digital media player of claim 12, wherein the memory comprises a solid-state memory in a memory card that is removably connectable with the portable digital media player.

15. The portable digital media player of claim 12, wherein no further user action is needed to play the digital media file after user selection of the one of the plurality of user-pressable user input elements.

16. The portable digital media player of claim 12 further comprising an additional user-pressable user input element, wherein the portable digital media player enters a standby mode in response to user selection of the additional user-pressable user input element, and wherein the portable digital media player exits the standby mode in response to user selection of one of the plurality of user-pressable user input elements.

17. The portable digital media player of claim 12, wherein a digital media file is grouped into one of the plurality of categories before the digital media file is provided to the portable digital media player.

18. The portable digital media player of claim 12, wherein a playlist specifies a play order of digital media files in each of the plurality of categories.

19. The portable digital media player of claim 12, wherein information associating the digital media file with the one of the plurality of categories is stored in a file separate from the digital media file.

20. The portable digital media player of claim 12, wherein each of the plurality of categories is associated with a respective subdirectory, and wherein a digital media file is grouped into a category by storing the digital media file in a subdirectory associated with that category.

\* \* \* \* \*